(12) United States Patent
Mehdi et al.

(10) Patent No.: US 11,460,843 B2
(45) Date of Patent: Oct. 4, 2022

(54) PARALLELIZED TREE-BASED DECISION SCHEME FOR AUTONOMOUS VEHICLE

(71) Applicant: GM Global Technology Operations LLC, Detroit, MI (US)

(72) Inventors: Syed B. Mehdi, Southfield, MI (US); Sayyed Rouhollah Jafari Tafti, Troy, MI (US); Pinaki Gupta, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 16/582,513

(22) Filed: Sep. 25, 2019

(65) Prior Publication Data

US 2021/0089030 A1 Mar. 25, 2021

(51) Int. Cl.
*G01C 22/00* (2006.01)
*G05D 1/00* (2006.01)
*G05D 1/02* (2020.01)
*G01C 21/34* (2006.01)
*G06V 20/56* (2022.01)

(52) U.S. Cl.
CPC ....... *G05D 1/0088* (2013.01); *G01C 21/3492* (2013.01); *G05D 1/0223* (2013.01); *G06V 20/588* (2022.01); *G05D 2201/0213* (2013.01)

(58) Field of Classification Search
CPC ......... G05D 1/0088; G05D 2201/0213; G06V 20/588; G01C 21/3492

USPC ........................................................... 701/23
See application file for complete search history.

(56) References Cited

U.S. PATENT DOCUMENTS

| | | | |
|---|---|---|---|
| 2013/0345963 A1* | 12/2013 | Solomon | G01C 21/3492 701/420 |
| 2019/0113918 A1* | 4/2019 | Englard | G05D 1/024 |
| 2020/0126417 A1* | 4/2020 | Selvam | G01C 21/00 |
| 2020/0363806 A1* | 11/2020 | Kobilarov | G05D 1/0088 |
| 2021/0046923 A1* | 2/2021 | Olson | B60W 30/09 |

* cited by examiner

*Primary Examiner* — Mahmoud S Ismail
(74) *Attorney, Agent, or Firm* — Cantor Colburn LLP

(57) ABSTRACT

A system or method implemented by an autonomous vehicle involves determining a path plan to reach a destination from an origin. The path plan includes two or more path steps indicating tasks to be completed to reach the destination. The method includes, during traversal of the path plan by the autonomous vehicle, evaluating one or more of the two or more path steps of a planning horizon to determine a behavior plan for the planning horizon. The planning horizon is based on a current position of the autonomous vehicle, the behavior plan includes a speed and a trajectory, and the evaluating includes performing a cost analysis using a parallelized tree-based decision scheme at each of two or more simulation intervals within the planning horizon. The evaluating and the determining the behavior plan is repeated at two or more positions of the autonomous vehicle from the origin to the destination.

18 Claims, 5 Drawing Sheets

PARALLELIZED TREE-BASED DECISION SCHEME FOR AUTONOMOUS VEHICLE

INTRODUCTION

The subject disclosure relates to a parallelized tree-based decision scheme for an autonomous vehicle.

As the level of autonomous operation increases in a vehicle (e.g., automobile, truck, farm equipment, construction equipment, automated factory equipment), the vehicle must make more decisions independently. For example, an autonomous vehicle referred to as a level 4 autonomous vehicle is one that includes controls that allow a human driver to take over but is also capable of fully autonomous operation. The number of decisions that such a vehicle must make are relatively large and the time within which a decision must be made is relatively small compared with semi-autonomous operation (e.g., adaptive cruise control, automated braking), for example. An algorithm that chooses from among the potential behaviors during autonomous operation is not only challenging to design but is also computationally intensive. Accordingly, it is desirable to provide a parallelized tree-based decision scheme for an autonomous vehicle.

SUMMARY

In one exemplary embodiment, a method implemented by an autonomous vehicle includes determining a path plan to reach a destination from an origin of the autonomous vehicle. The path plan includes two or more path steps that indicate tasks to be completed to reach the destination. During traversal of the path plan by the autonomous vehicle, the method includes evaluating one or more of the two or more path steps that are part of a planning horizon to determine a behavior plan for the planning horizon. The planning horizon is based on a current position of the autonomous vehicle, the behavior plan includes a speed and a trajectory for the autonomous vehicle to complete the one or more of the two or more path steps, and the evaluating includes performing a cost analysis using a parallelized tree-based decision scheme at each of two or more simulation intervals within the planning horizon. The method also includes repeating the evaluating and the determining the behavior plan for the planning horizon at two or more positions of the autonomous vehicle from the origin to the destination.

In addition to one or more of the features described herein, the performing the cost analysis includes obtaining a decision tree for each of the one or more of the two or more path steps in the simulation interval within the planning horizon indicating optional actions associated with each of the one or more of the two or more path steps in the planning horizon.

In addition to one or more of the features described herein, the performing the cost analysis includes determining a cost associated with each of the optional actions of each of the decision trees associated with each of the one or more of the two or more path steps in the simulation interval within the planning horizon.

In addition to one or more of the features described herein, determining the behavior plan includes selecting a lowest-cost action among the optional actions for each of the two or more simulation intervals within the planning horizon.

In addition to one or more of the features described herein, the repeating the evaluating and the determining the behavior plan is performed continuously during the traversal of the path plan by the autonomous vehicle.

In addition to one or more of the features described herein, during the traversal of the path plan, the determining the behavior plan also includes the performing the cost analysis for conditions indicating tasks that are encountered in real-time and are additional to the tasks indicated by path steps.

In addition to one or more of the features described herein, the determining the path plan includes determining a primary path plan including two or more primary path steps prior to the traversal and determining an alternate path plan including two or more alternate path steps during the traversal, the evaluating the one or more of the two or more path steps that are part of the planning horizon includes determining if one or more of the two or more alternate path steps are in the planning horizon, and evaluating the one or more of the two or more alternate path steps in the planning horizon based on the determining indicating that the one or more of the two or more alternate path steps are in the planning horizon.

In addition to one or more of the features described herein, the evaluating the one or more of the two or more path steps includes obtaining a decision tree for each of the one or more of the two or more primary path steps in the planning horizon indicating optional actions associated with each of the one or more of the two or more primary path steps in the two or more simulation intervals within the planning horizon and obtaining a decision tree for each of the one or more of the two or more alternate path steps in the two or more simulation intervals within the planning horizon indicating optional actions associated with each of the one or more of the two or more alternate path steps in the planning horizon.

In addition to one or more of the features described herein, the performing the cost analysis includes determining a primary cost associated with each of the optional actions of each of the decision trees associated with each of the one or more of the two or more primary path steps in each of the two or more simulation intervals within the planning horizon and determining an alternate cost associated with each of the optional actions of each of the decision trees associated with each of the one or more of the two or more alternate path steps in each of the two or more simulation intervals within the planning horizon.

In addition to one or more of the features described herein, the method also includes comparing the primary cost and the alternate cost to select between the behavior plan from the primary path plan and the behavior plan from the alternate path plan to traverse with the autonomous vehicle.

In another exemplary embodiment, a system in an autonomous vehicle includes a memory device to store a path plan to reach a destination from an origin of the autonomous vehicle. The path plan includes two or more path steps. The system also includes a processor to evaluate one or more of the two or more path steps that are part of a planning horizon to determine a behavior plan for the planning horizon, during traversal of the path plan by the autonomous vehicle. The planning horizon is based on a current position of the autonomous vehicle, the behavior plan includes a speed and a trajectory for the autonomous vehicle to complete the one or more of the two or more path steps, and the evaluating includes performing a cost analysis using a parallelized tree-based decision scheme at each of two or more simulation intervals within the planning horizon. The processor repeats a process of determining the behavior plan for the planning horizon at two or more positions of the autonomous vehicle from the origin to the destination.

In addition to one or more of the features described herein, the processor obtains a decision tree for each of the one or more of the two or more path steps in the planning horizon indicating optional actions associated with each of the one or more of the two or more path steps in the simulation interval within the planning horizon.

In addition to one or more of the features described herein, the processor determines a cost associated with each of the optional actions of each of the decision trees associated with each of the one or more of the two or more path steps in the simulation interval within the planning horizon.

In addition to one or more of the features described herein, the processor selects a lowest-cost action among the optional actions for each of the two or more simulation intervals within the planning horizon.

In addition to one or more of the features described herein, repeating the process of determining the behavior plan is performed continuously during the traversal of the path plan by the autonomous vehicle.

In addition to one or more of the features described herein, during the traversal of the path plan, the processor determines the behavior plan by additionally performing the cost analysis for conditions indicating tasks that are encountered in real-time and are additional to the tasks indicated by path steps.

In addition to one or more of the features described herein, the processor determines a primary path plan including two or more primary path steps prior to the autonomous vehicle leaving the origin and to determine an alternate path plan including two or more alternate path steps after the autonomous vehicle has left the origin and prior to the autonomous vehicle reaching the destination, determines if one or more of the two or more alternate path steps are in the planning horizon, and evaluates the one or more of the two or more alternate path steps in the planning horizon based on the determining indicating that the one or more of the two or more alternate path steps are in the planning horizon.

In addition to one or more of the features described herein, the processor obtains a decision tree for each of the one or more of the two or more primary path steps in the planning horizon indicating optional actions associated with each of the one or more of the two or more primary path steps in the two or more simulation intervals within the planning horizon and to obtain a decision tree for each of the one or more of the two or more alternate path steps in the two or more simulation intervals within the planning horizon indicating optional actions associated with each of the one or more of the two or more alternate path steps in the planning horizon.

In addition to one or more of the features described herein, the processor determines a primary cost associated with each of the optional actions of each of the decision trees associated with each of the one or more of the two or more primary path steps in each of the two or more simulation intervals within the planning horizon and determines an alternate cost associated with each of the optional actions of each of the decision trees associated with each of the one or more of the two or more alternate path steps in each of the two or more simulation intervals within the planning horizon.

In addition to one or more of the features described herein, the processor compares the primary cost and the alternate cost to select between the behavior plan from the primary path plan and the behavior plan from the alternate path plan to traverse with the autonomous vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
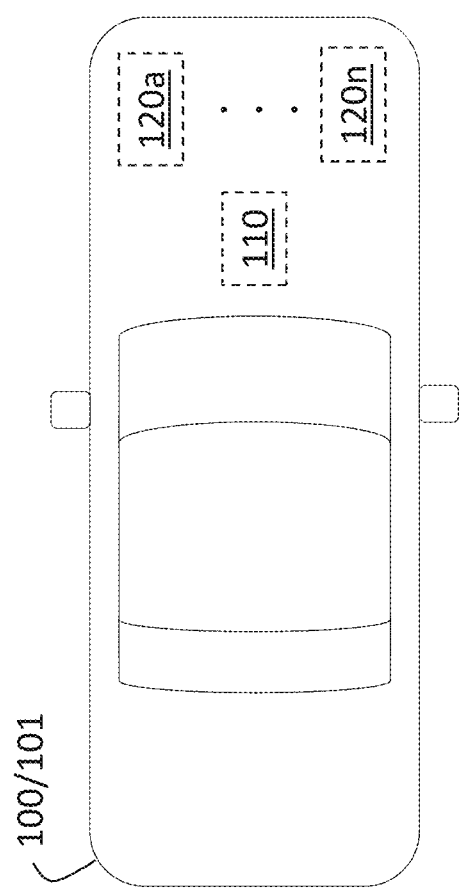
FIG. 1 is a block diagram of a vehicle that implements a parallelized tree-based decision scheme for autonomous operation according to one or more embodiments.

The following description is merely exemplary in nature and is not intended to limit the present disclosure, its application or uses. It should be understood that throughout the drawings, corresponding reference numerals indicate like or corresponding parts and features.

As previously noted, as the degree to which independent operation is carried out increases, the decisions that must be made by a vehicle increase. As also noted, an algorithm to choose from among the potential behaviors is both complicated and computationally costly. Embodiments of the systems and methods detailed herein relate to a parallelized tree-based decision scheme for an autonomous vehicle. The speed of decision making is increased through the parallel analysis. In addition, situations that are encountered via different branches for the same time period are handled efficiently by re-using a determined cost, rather than re-computing cost for each branch, to reduce overall computation. As detailed, a path plan, which specifies a sequence of path steps to navigate from an origin to a destination, is used as an input. A behavior plan, which specifies how to perform the navigation steps, is obtained through the parallelized tree-based decision scheme according to one or more embodiments.

In accordance with an exemplary embodiment, FIG. 1 is a block diagram of a vehicle 100 that implements a parallelized tree-based decision scheme for autonomous operation. The exemplary vehicle 100 shown in FIG. 1 is an automobile 101. The vehicle 100 includes sensors 120a through 120n (generally referred to as 120). The sensor 120 may include one or more radar systems, one or more lidar systems, and one or more cameras, for example. The sensors 120 may be located anywhere within or on the vehicle 100 to detect objects around the vehicle 100 and facilitate decision making according to the parallelized tree-based scheme. The vehicle 100 also includes a controller 110. Data collected by each of the sensors 120 may be processed within the sensor and provided to the controller 110, data from each sensor 120 may be provided to the controller 120 for processing, or a combination of the sensor 120 and the controller 110 may process data to obtain information from each sensor 120. The controller 110 may control or communicate with other controllers that control operation of the vehicle 100. The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
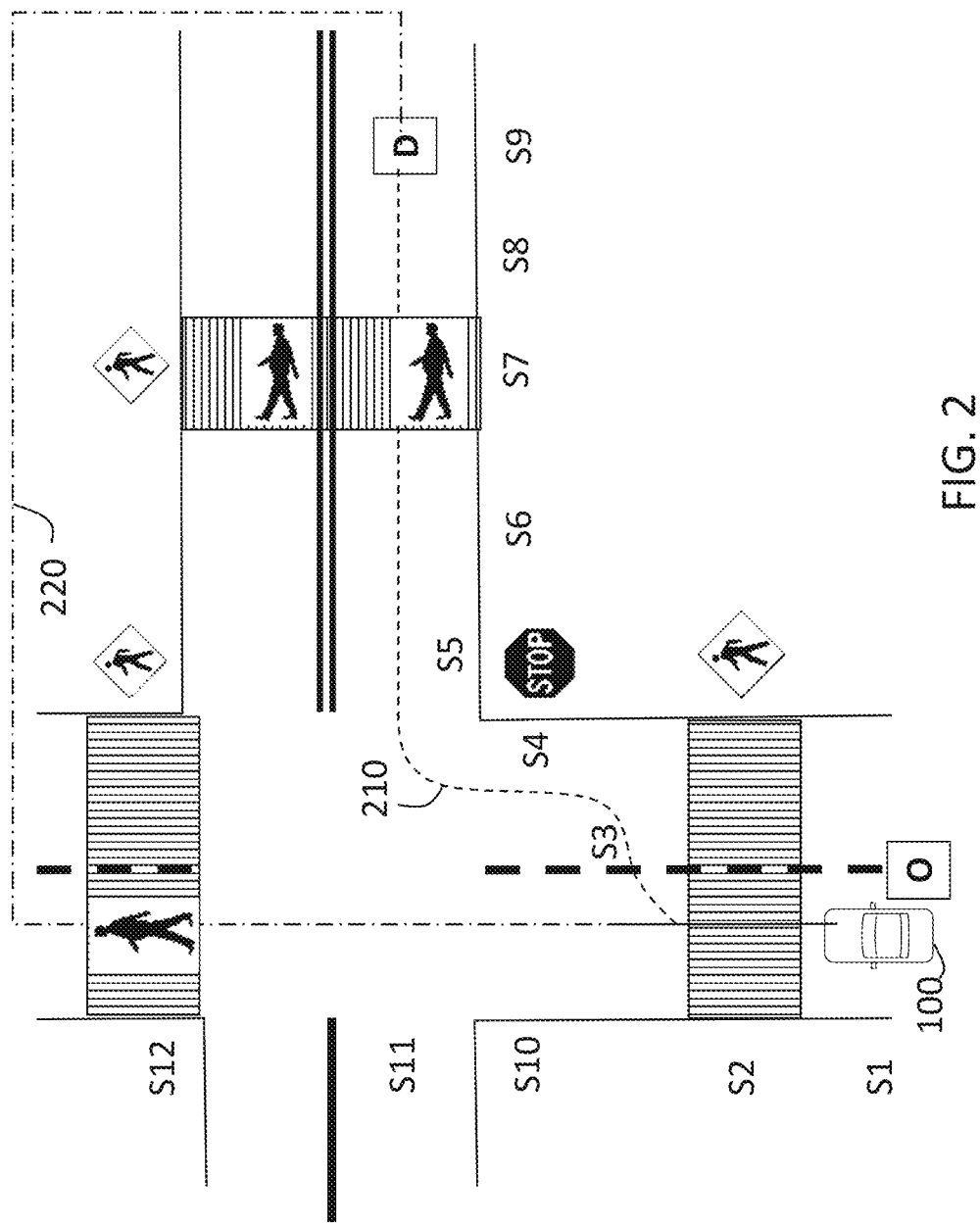
FIG. 2 is an exemplary scenario used to illustrate a parallelized tree-based decision scheme for autonomous operation of a vehicle according to one or more embodiments.

FIG. 2 is an exemplary scenario used to illustrate a parallelized tree-based decision scheme for autonomous operation of a vehicle 100 according to one or more embodiments. A vehicle 100 is shown at an origin O. For the vehicle 100 to reach a destination D, a primary path plan 210 is determined by the controller 110. An alternative path plan 220 is also shown. The alternate path plan 220 is not generated prior to the trip like the primary path plan 210. The primary path plan 210 is made up of path steps S1 through S9, and some of the path steps associated with the alternative path plan 220 are also indicated. Each of the path steps indicates a task for the autonomous vehicle 100. Table 1 indicates the tasks associated with exemplary path steps S1 through S9.

TABLE 1

Exemplary path steps and the corresponding tasks.

| STEP | TASK |
|---|---|
| S1 | maintain the current lane up to the crosswalk |
| S2 | drive through the crosswalk |
| S3 | shift one lane to the right |
| S4 | stop at the stop sign |
| S5 | turn right |
| S6 | maintain the current lane up to the crosswalk |
| S7 | drive through the crosswalk |
| S8 | maintain the current lane |
| S9 | stop at destination |

As previously noted, the primary path plan 210 is generated by the controller 110 prior to the vehicle 100 leaving the origin O. One or more alternate path plans 220 may be generated during the trip based on encountered conditions. Each path plan 210, 220 may be determined based on a map. Traffic and weather data obtained via communication by the controller 110 may also be used to determine the path plans 210, 220. While the path steps indicate the static task (i.e., one that does not consider real-time conditions) that the vehicle 100 must perform along the route indicated by a path plan 210, 220, a level 4 autonomous vehicle 100 must assess the real-time environment during traversal of a path plan 210, 220 and determine the best behavior (e.g., speed, signal, maneuver) to accomplish the task indicated by each path step. The potential behaviors that are considered are referred to as actions for explanatory purposes. For example, if a path step indicates a task of maintaining the current lane, then based on the real-time situation (e.g., a motorcycle ahead of the vehicle 100 in the lane), actions may include maintaining speed or using adaptive cruise control (i.e., slowing and resuming speed based on the speed of other objects in front of the vehicle 100). The behavior plan represents a selection among these actions. The best behavior (i.e., the selection among the actions) is judged according to cost optimization, as further discussed with reference to FIG. 4. For a given planning horizon, as further detailed, the lowest-cost action among the actions considered is selected as a behavior step and becomes part of the behavior plan.

The controller 110 assesses the actions over a series of planning horizons throughout the trip from the origin O to the destination D. That is, while a single primary path plan 210 sets out path steps from the origin O to the destination D, multiple behavior plans over multiple planning horizons that each cover a subset of the primary path plan 210 are used to make decisions about how to traverse the path steps between the origin O and destination D. If path steps of an alternate path plan 220 are within a given planning horizon, then actions corresponding to the alternate path plan 220 are also considered, along with actions corresponding to the primary path plan 210, to select behavior steps for a behavior plan for the alternate path plan 220. A least-cost behavior plan (e.g., fastest) for the planning horizon results from a selection between the behavior plan for the primary path plan 210 and the behavior plan for the alternate path plan 220.

A planning horizon may be defined by a particular distance ahead of the vehicle 100, a particular number of path steps, or a particular amount of time (e.g., 7 seconds ahead) and the corresponding distance estimated to be traversed over that time. The planning horizon can be regarded as a simulation of the near future based on information obtained from sensors 120 regarding objects in the vicinity of the vehicle 100, signs, traffic lights, lane markings, and the like. Whichever criteria is used to select the planning horizon, the end position of the planning horizon remains unchanged for a given number of simulations. This is further discussed with reference to the exemplary scenario shown in FIG. 2.

The optimal (according to cost) actions (i.e., behavior steps) to accomplish the tasks indicated by the path steps within the planning horizon make up a behavior plan. Thus, beginning at the origin O, the vehicle 100 continually develops a behavior plan for the upcoming path steps within a planning horizon. As further detailed, the development of a behavior plan for a given planning horizon involves the simulation of times in the future at multiple intervals. As the vehicle 100 progresses to the destination D, the path steps that are part of the planning horizon change. For example, for the position of the vehicle 100 shown in FIG. 2, an exemplary planning horizon of 7 seconds may correspond with the distance to the stop sign (path step S4) based on the estimated speed of the vehicle 100. Over the 7 second planning horizon, behavior steps of the behavior plan may be selected based on simulating a position of the vehicle 100 every 0.5 second. That is, the states of the vehicle 100 and all objects around the vehicle 100 are simulated at 0.5 second intervals into the future (i.e., 0.5 seconds ahead, 1.0 seconds ahead, 1.5 seconds ahead, etc.). The simulation at 3 seconds, for example, may position the vehicle 100 at the crosswalk (path step S2). Thus, the actions considered in order to select a behavior step may be actions pertaining to path steps S2, S3, and S4, but the path step S1 would have been passed, according to the simulations, and would, therefore, not be part of the simulation at the 3 second interval within the planning horizon.

Figure 3:
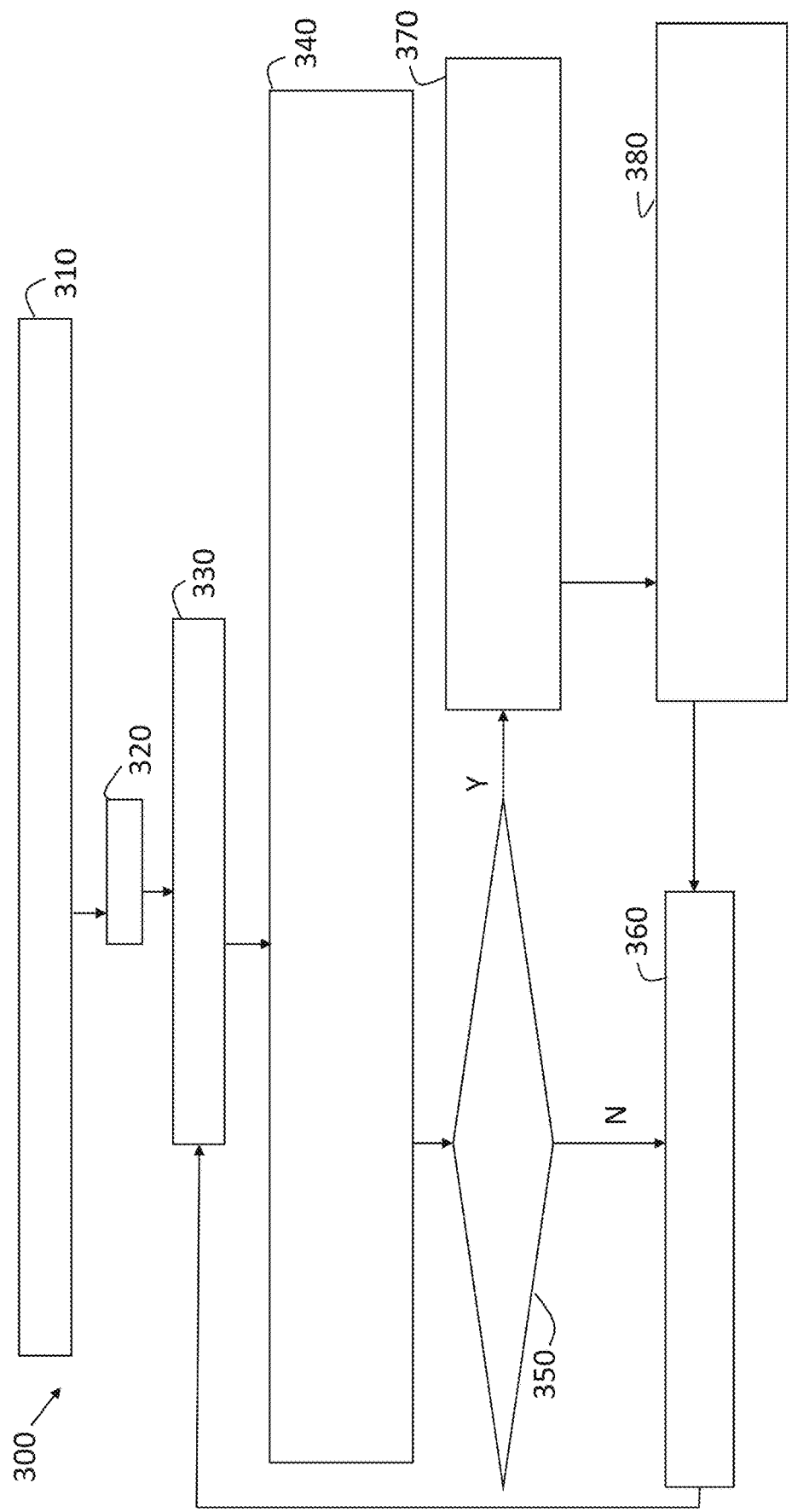
FIG. 3 is a process flow of a method of determining a behavior plan for a planning horizon as part of a parallelized tree-based decision scheme for autonomous driving according to one or more embodiments.
Figure 4:
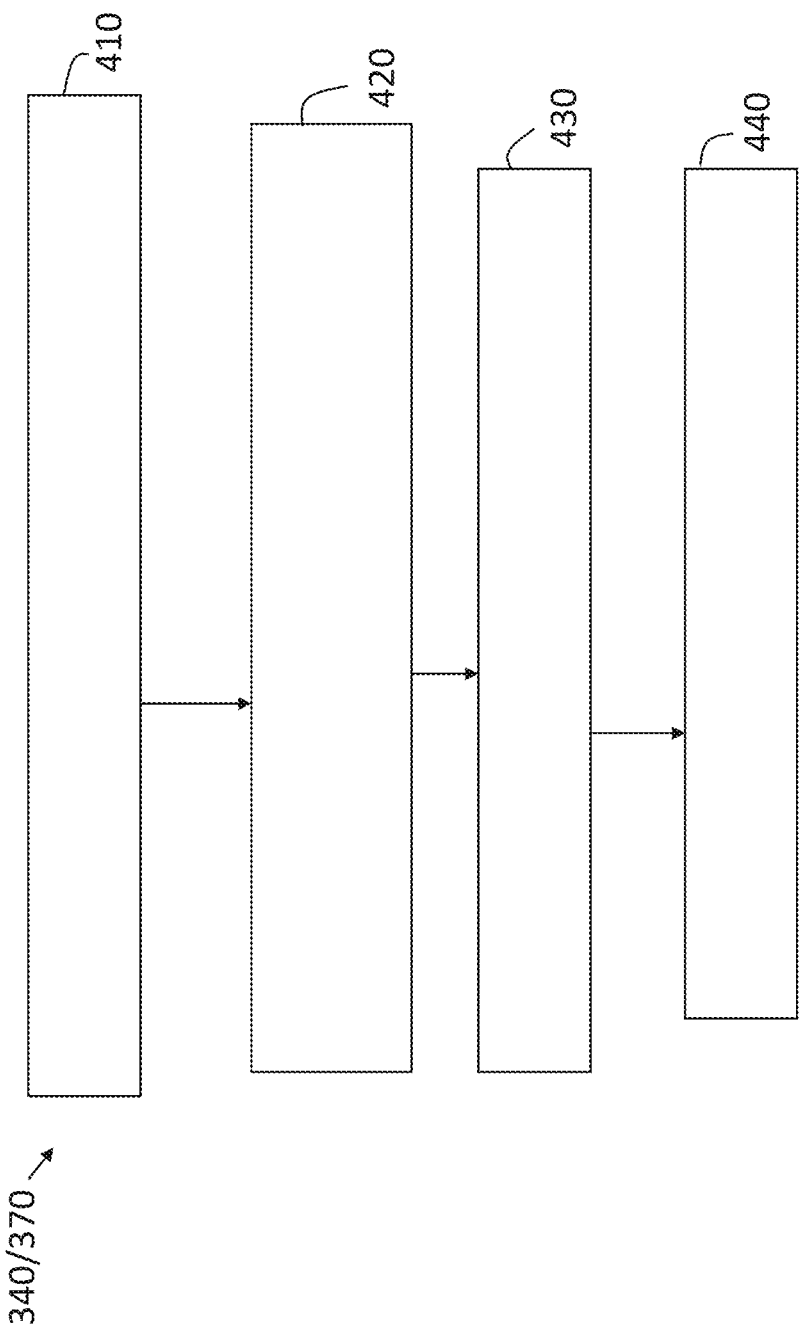
FIG. 4 is a process flow detailing the process of generating a behavior plan for a given planning horizon according to one or more embodiments.

Actions are considered for every relevant (i.e., still pending) path step in the planning horizon at each simulation interval (e.g., 0.5 seconds) of the planning horizon. Only one action (i.e., the lowest-cost action) among the actions considered at each simulation interval is selected as the behavior step for that simulation interval. For example, for a simulation interval (e.g., 2.5 seconds into the future) within the exemplary planning horizon noted previously, the path steps S2, S3, and S4 may be considered. Specifically, the costs associated with actions pertaining to path steps S2, S3, and S4 are compared. If, as determined by the comparison, the lowest-cost action is slowing to a stop based on the stop sign that is part of path step S4, for example, then the behavior step for the simulation interval of 2.5 seconds within the exemplary planning horizon is slowing to a stop. The behavior step is determined using a parallelized tree-based decision scheme as detailed with reference to FIGS. 3 and 4. FIGS. 3 and 4 are discussed with continuing reference to FIGS. 1 and 2. The behavior plan for a given planning horizon is a sequence of behavior steps determined at the simulation intervals within the planning horizon.

FIG. 3 is a process flow of a method 300 of determining a behavior plan for a planning horizon as part of a parallelized tree-based decision scheme for autonomous driving according to one or more embodiments. At block 310, the process includes developing a primary path plan 210 with path steps to reach a destination D from an origin O. As previously noted, the primary path plan 210 is developed prior to the vehicle 100 leaving the origin O. At block 320, starting the trip refers to leaving the origin O. At block 330, defining the current planning horizon refers to determining the planning horizon (e.g., distance ahead of the vehicle 100, time, number of path steps directly in front of the vehicle 100) based on the current position of the vehicle 100. In the exemplary scenario shown in FIG. 2, for example, the planning horizon would likely include path steps S1 and S2 when the vehicle 100 is at the origin O, but the planning horizon would not include path steps S1 or S2 once the vehicle 100 reached the stop sign at path step S4.

At block 340, for each simulation interval, evaluating one or more path steps and unmapped path steps that are part of the current simulation interval of the current planning horizon based on a cost analysis using a parallelized tree-based decision scheme to determine a behavior step is detailed with reference to FIG. 4. As previously noted, simulations are performed iteratively within the planning horizon at regular intervals. The behavior step determined at each simulation interval is combined with other behavior steps determined at other simulation intervals within the same planning horizon to make up the behavior plan. For a given simulation interval within the planning horizon, the position of the vehicle 100 and other objects are based on a behavior step selected in the previous simulation interval. That is, the initial conditions for a given simulation interval within a given planning horizon are simulated in accordance with the behavior step determined for the previous simulation interval. Within a given planning horizon, the path steps represent apriori knowledge based on a map or other source. For example, a path step that indicates a task to drive through a crosswalk requires knowledge of the presence of a crosswalk during the path planning process based on a map, for example. In a given planning horizon, unmapped path steps (e.g., unmapped crosswalk, unmapped traffic light, unmapped traffic sign) may be encountered that are not already addressed by a path step in the primary path plan 210.

At block 350, a check is done of whether any alternate paths are in the planning horizon. Specifically, the check determines whether any path steps from one or more alternate path plans 220 are within the planning horizon defined at block 330 based on the current position of the vehicle 100. This may happen, for example, if traffic status or communication that indicated an accident along the primary path plan 210 led the controller 110 to generate an alternate path plan 220 during the drive. If no alternate path plan 220 is encountered within the planning horizon, then the behavior plan determined for the primary path plan 210, at block 340, is output for the current planning horizon at block 360. The behavior plan is implemented by the vehicle 100 even as it is updated through the next iteration starting at block 330.

If the check at block 350 determines that there is at least one path step pertaining to an alternate path plan 220 in the planning horizon defined at block 330, then the processes at blocks 370 and 380 are performed. At block 370, the process is similar to the one performed at block 340 and detailed with reference to FIG. 4. The result is a behavior plan associated with each alternate path plan 220 with path steps that are part of the planning horizon. At block 380, comparing the cost of the behavior plan for the primary path plan 210 (from block 340) with the cost of the behavior plan determined for each alternate path plan 220 (at block 370) leads to selecting the behavior plan with the least cost. The least costly behavior plan may be one that involves the fastest driving. That is, slower driving may be considered a higher cost when comparing behavior plans associated with different path plans 210, 220. At block 360, the behavior plan selected at block 380, which may be associated with the primary path plan 210 or one of the alternate path plans 220, is output for implementation by the vehicle 100. In the next iteration, the current planning horizon that is defined will involve path steps and conditions of the path plan 210, 220 selected at block 380.

FIG. 4 is a process flow detailing the process of generating a behavior plan for a given planning horizon at blocks 340 and 370 of FIG. 3. As shown in FIG. 3, the current planning horizon is defined at block 330. Thus, whether the behavior plan is developed for the primary path plan 210 (at block 340) or an alternate path plan 220 (at block 370), the processes shown in FIG. 4 are performed for the corresponding path steps, any unmapped path steps, and real-time conditions within the planning horizon. The processes at blocks 410, 420, and 430 are repeated at each simulation interval within the planning horizon. At block 410, determining a hierarchical decision tree for each path step and unmapped path step relevant to the simulation interval is further discussed with reference to FIG. 5. Each branch of the decision tree represents an action based on a real-time condition. For example, for a path step indicating a task of driving through a crosswalk or for an unmapped crosswalk, one exemplary branch of the decision tree may pertain to the action of yielding to a pedestrian in the center of crosswalk. Another exemplary branch may pertain to the action of yielding to a pedestrian at the start of the crosswalk. Still another exemplary branch may pertain to the action of maintaining the lane in the absence of any pedestrians or because a pedestrian is exiting the crosswalk. Based on the real-time condition (e.g., presence and position of pedestrian, absence of pedestrian), some branches are not relevant and, thus, their cost is not considered.

At block 420, the process includes computing or reusing, in parallel for each decision tree, the cost of each relevant action indicated by the decision tree. One of the efficiencies obtained according to one or more embodiments is based on the fact that the same branch of a decision tree may be relevant to more than one path step that is part of the same planning horizon. In that case, the cost associated with the branch need not be re-determined but, instead, may be reused after being determined once for that planning horizon. As further discussed with reference to FIG. 5, the cost refers to both spatial cost (SC) and temporal cost (TC). Spatial cost (SC) is a cost associated with lateral motion (e.g., lane change, maneuvering around a parked vehicle)

and is zero otherwise. Temporal cost (TC) is proportional to acceleration and, thus, decreases with deceleration.

At block 430, for each decision tree, which is associated with a path step or unmapped path step in the planning horizon (for the relevant simulation interval), selecting an action based on cost refers to selecting the minimum cost action. This is further discussed with reference to FIG. 5. The lowest-cost action among the actions selected for each path step or unmapped path step is the behavior step for a given simulation interval. At block 440, generating a behavior plan from the behavior steps refers to putting together the behavior steps from each of the simulation intervals of the planning horizon as the behavior plan of the planning horizon.

Figure 5:
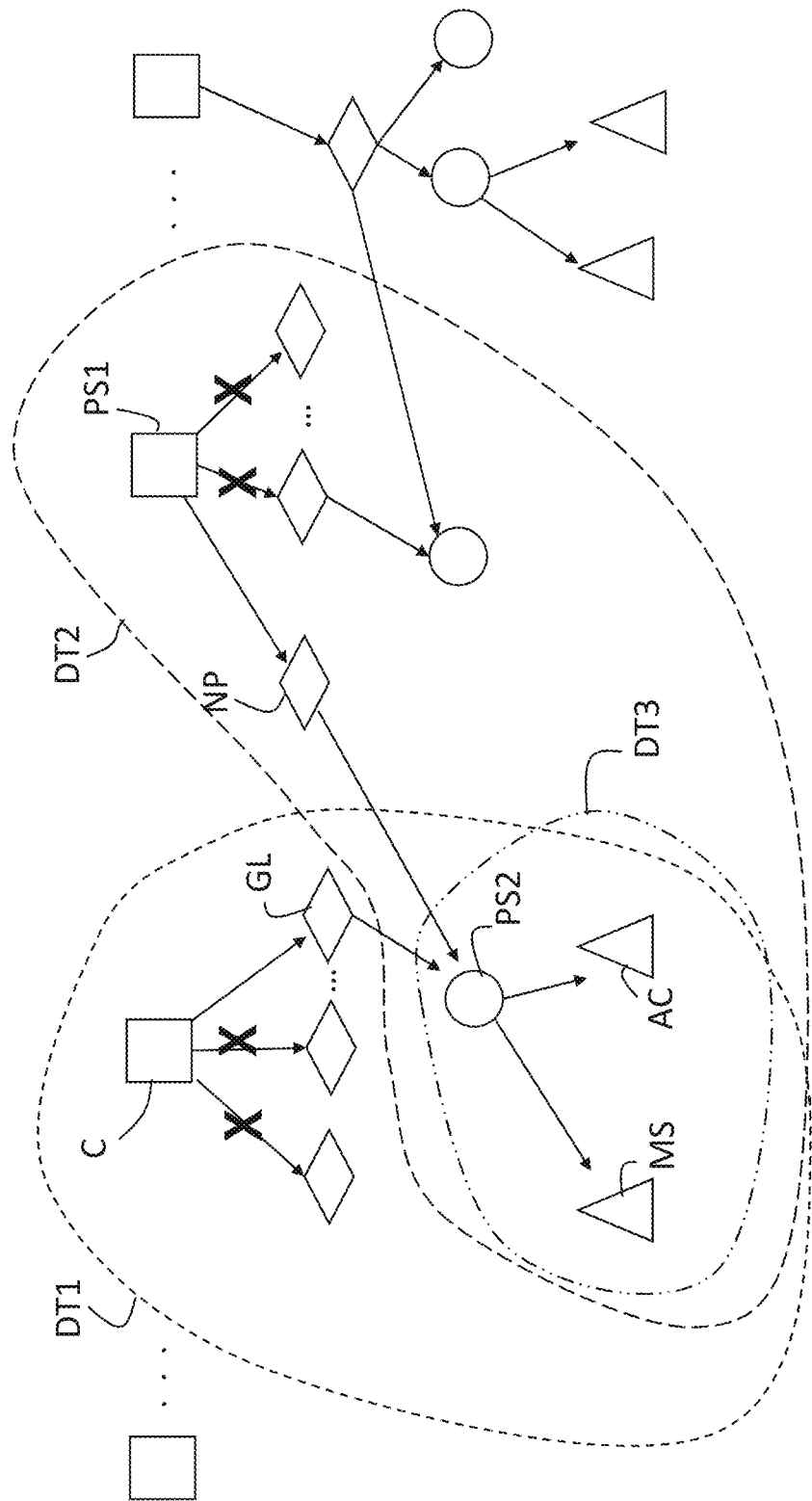
FIG. 5 illustrates an exemplary tree-based decision scheme according to one or more embodiments.

FIG. 5 illustrates an exemplary tree-based decision scheme according to one or more embodiments. The tree-based decision scheme may and will likely involve many more decision trees than shown for explanatory purposes in FIG. 5. In FIG. 5, path steps and unmapped path steps are indicated by square shapes, real-time conditions (e.g., number of pedestrians present in a crosswalk, color of a traffic light) are indicated as diamond shapes, tasks (e.g., maintain current lane, stop) are indicated as circles, and actions (e.g., maintain speed, enable adaptive cruise control) or ways to achieve the tasks are indicated as triangles. The tasks, when part of a path plan 210, 220, may be path steps themselves as discussed with reference to the second exemplary path step PS2. Each decision tree represents a set of actions. Based on real-time conditions, some branches of a decision tree (i.e., some potential actions) may be pruned. Each unpruned branch of the decision tree is associated with a cost that includes spatial cost SC and temporal cost TS. The cost is further discussed following a discussion of an unmapped path step C and path steps PS1, PS2.

An exemplary simulation interval of an exemplary planning horizon includes an exemplary unmapped path step C and two exemplary path steps PS1 and PS2. Thus, according to the process at block 410, decision tree DT1 is determined for the unmapped path step C (e.g., an unmapped traffic light), decision tree DT2 is determined for the path step PS1 (e.g., driving through a crosswalk), and decision tree DT3 is determined for the path step PS2 (e.g., maintaining the current lane). As shown in FIG. 5, the decision tree DT3 associated with the second path step PS2 is part of the decision trees DT1 and DT2 associated with the condition C and the path step PS1 in the same planning horizon. That is, for at least some of the simulations performed within the same planning horizon, all of the decision trees DT1, DT2, DT3 may be relevant in selecting actions.

The decision tree DT1 for the exemplary unmapped path plan C of an unmapped traffic light being encountered in the current planning horizon is discussed first. The real-time condition RTC of the light being green is true in the exemplary planning horizon. Thus, branches associated with the other potential real-time conditions (e.g., yellow light, red light, flashing yellow light, flashing red light) are crossed out. For the real-time condition of a green light GL, the corresponding task is maintaining the current lane, which also happens to be a path step PS2 that is part of the same planning horizon. This task or path step PS2 branches to two potential actions. One is maintaining speed MS and the other is using adaptive cruise control AC. These are discussed with reference to the decision tree DT3 for the second path step PS2 in the planning horizon.

The decision tree DT2 for the exemplary path step PS1 of driving through a crosswalk has many potential real-time conditions associated with it. For example, one pedestrian may be entering the crosswalk during the planning horizon (which would require stopping), one pedestrian may be exiting the crosswalk during the planning horizon (which would not require stopping), multiple pedestrians may be positioned at different locations of the crosswalk, or, as in the exemplary real-time condition, no pedestrians NP. The other real-time conditions, which are not the case in the exemplary planning horizon, are crossed out. The task corresponding with no pedestrians NP is maintaining the current lane (i.e., the other path step PS2).

The decision tree DT3 is a subset of the decision trees DT1 and DT2 and is the decision tree DT3 for the second path step PS2 of maintaining the current lane. This task or path step PS2 branches to the potential actions of maintaining speed MS and adaptive cruise control AC. If nothing (e.g., motorcycle, car) were within a threshold distance ahead of the vehicle 100 in the lane, then the adaptive cruise control AC behavioral action could be crossed out as unnecessary. As previously noted, each branch of each decision tree represents a potential action. Some of these actions are not called for by the real-time condition within the planning horizon and, thus, are eliminated as actions whose cost is considered.

The cost associated with the actions of maintaining speed MS and adaptive cruise control AC need only be determined once within the planning horizon for a given interval (e.g., for the simulation at 0.5 seconds into a 5 second planning horizon). This cost applies to all three decision trees DT1, DT2, and DT3 for the same interval of the same planning horizon. Specifically, because staying in the same lane does not involve any lateral motion, the spatial cost SC is 0. The temporal cost TC for maintaining the speed is 0, since temporal cost TC is proportional to acceleration. In the exemplary planning horizon, a motorcycle ahead of the vehicle 100 may require slowing. Thus, the temporal cost TC associated with decelerating (negative accelerating) is −1. In sum, the cost associated with the path step PS2 of maintaining the current lane using the action of maintaining speed is SC=0 and TC=0 and the cost associated with the path step PS2 of maintaining the current lane using the action of adaptive cruise control is SC=0 and TC=−1.

Thus, the cost is lower for the action of using adaptive cruise control in the exemplary simulation interval of the exemplary planning horizon. That is, the least-cost action among the actions for the unmapped path step C of an unmapped traffic light which is a green light GL, a path step PS1 of driving through a crosswalk with no pedestrians NP, and the path step PS2 of maintaining the current lane is adaptive cruise control. Thus, the behavior step for the exemplary simulation interval of the exemplary planning horizon is using adaptive cruise control. This behavior step will also be used to set up the real-time conditions for the next simulation interval within the planning horizon.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method implemented by an autonomous vehicle, the method comprising:

determining, using a processor, a path plan to reach a destination from an origin of the autonomous vehicle, the path plan including two or more path steps that indicate tasks to be completed to reach the destination;

during traversal of the path plan by the autonomous vehicle, evaluating, using the processor, one or more of the two or more path steps that are part of a planning horizon to determine a behavior plan for the planning horizon, the planning horizon being based on a current position of the autonomous vehicle, the behavior plan including a speed and a trajectory for the autonomous vehicle to complete the one or more of the two or more path steps, and the evaluating including performing a cost analysis using a parallelized tree-based decision scheme at each of two or more simulation intervals within the planning horizon, wherein the determining the path plan includes determining a primary path plan including two or more primary path steps prior to the traversal and determining an alternate path plan including two or more alternate path steps during the traversal for a same planning horizon, the evaluating the one or more of the two or more path steps that are part of the planning horizon includes determining if one or more of the two or more alternate path steps are in the planning horizon, and evaluating the one or more of the two or more alternate path steps in the planning horizon based on the determining indicating that the one or more of the two or more alternate path steps are in the planning horizon;

repeating the evaluating and the determining the behavior plan for the planning horizon at two or more positions of the autonomous vehicle from the origin to the destination; and controlling operation of the vehicle according to the behavior plan determined at each planning horizon.

2. The method according to claim 1, wherein the performing the cost analysis includes obtaining a decision tree for each of the one or more of the two or more path steps in the simulation interval within the planning horizon indicating optional actions associated with each of the one or more of the two or more path steps in the planning horizon.

3. The method according to claim 2, wherein the performing the cost analysis includes determining a cost associated with each of the optional actions of each of the decision trees associated with each of the one or more of the two or more path steps in the simulation interval within the planning horizon.

4. The method according to claim 2, wherein determining the behavior plan includes selecting a lowest-cost action among the optional actions for each of the two or more simulation intervals within the planning horizon.

5. The method according to claim 1, wherein the repeating the evaluating and the determining the behavior plan is performed continuously during the traversal of the path plan by the autonomous vehicle.

6. The method according to claim 1, wherein during the traversal of the path plan, the determining the behavior plan also includes the performing the cost analysis for conditions indicating tasks that are encountered in real-time and are additional to the tasks indicated by path steps.

7. The method according to claim 1, wherein the evaluating the one or more of the two or more path steps includes obtaining a decision tree for each of the one or more of the two or more primary path steps in the planning horizon indicating optional actions associated with each of the one or more of the two or more primary path steps in the two or more simulation intervals within the planning horizon and obtaining a decision tree for each of the one or more of the two or more alternate path steps in the two or more simulation intervals within the planning horizon indicating optional actions associated with each of the one or more of the two or more alternate path steps in the planning horizon.

8. The method according to claim 7, wherein the performing the cost analysis includes determining a primary cost associated with each of the optional actions of each of the decision trees associated with each of the one or more of the two or more primary path steps in each of the two or more simulation intervals within the planning horizon and determining an alternate cost associated with each of the optional actions of each of the decision trees associated with each of the one or more of the two or more alternate path steps in each of the two or more simulation intervals within the planning horizon.

9. The method according to claim 8, further comprising comparing the primary cost and the alternate cost to select between the behavior plan from the primary path plan and the behavior plan from the alternate path plan to traverse with the autonomous vehicle.

10. A system in an autonomous vehicle, the system comprising:
    a memory device configured to store a path plan to reach a destination from an origin of the autonomous vehicle, the path plan including two or more path steps; and
    a processor configured to evaluate one or more of the two or more path steps that are part of a planning horizon to determine a behavior plan defining operation of the vehicle for the planning horizon, during traversal of the path plan by the autonomous vehicle, the planning horizon being based on a current position of the autonomous vehicle, the behavior plan including a speed and a trajectory for the autonomous vehicle to complete the one or more of the two or more path steps, and the evaluating including performing a cost analysis using a parallelized tree-based decision scheme at each of two or more simulation intervals within the planning horizon, and to repeat a process of determining the behavior plan for the planning horizon at two or more positions of the autonomous vehicle from the origin to the destination, wherein the operation of the vehicle is controlled according to the behavior plan determined at each planning horizon and the processor is configured to determine a primary path plan including two or more primary path steps prior to the autonomous vehicle leaving the origin and to determine an alternate path plan including two or more alternate path steps for a same planning horizon after the autonomous vehicle has left the origin and prior to the autonomous vehicle reaching the destination, to determine if one or more of the two or more alternate path steps are in the planning horizon, and to evaluate the one or more of the two or more alternate path steps in the planning horizon based on the determining indicating that the one or more of the two or more alternate path steps are in the planning horizon.

11. The system according to claim 10, wherein the processor is configured to obtain a decision tree for each of the one or more of the two or more path steps in the planning horizon indicating optional actions associated with each of the one or more of the two or more path steps in the simulation interval within the planning horizon.

12. The system according to claim 11, wherein the processor is configured to determine a cost associated with each of the optional actions of each of the decision trees associated with each of the one or more of the two or more path steps in the simulation interval within the planning horizon.

13. The system according to claim 11, wherein the processor is configured to select a lowest-cost action among the optional actions for each of the two or more simulation intervals within the planning horizon.

14. The system according to claim 10, wherein repeating the process of determining the behavior plan is performed continuously during the traversal of the path plan by the autonomous vehicle.

15. The system according to claim 10, wherein during the traversal of the path plan, the processor is configured to determine the behavior plan by additionally performing the cost analysis for conditions indicating tasks that are encountered in real-time and are additional to the tasks indicated by path steps.

16. The system according to claim 10, wherein the processor is configured to obtain a decision tree for each of the one or more of the two or more primary path steps in the planning horizon indicating optional actions associated with each of the one or more of the two or more primary path steps in the two or more simulation intervals within the planning horizon and to obtain a decision tree for each of the one or more of the two or more alternate path steps in the two or more simulation intervals within the planning horizon indicating optional actions associated with each of the one or more of the two or more alternate path steps in the planning horizon.

17. The system according to claim 16, wherein the processor is configured to determine a primary cost associated with each of the optional actions of each of the decision trees associated with each of the one or more of the two or more primary path steps in each of the two or more simulation intervals within the planning horizon and to determine an alternate cost associated with each of the optional actions of each of the decision trees associated with each of the one or more of the two or more alternate path steps in each of the two or more simulation intervals within the planning horizon.

18. The system according to claim 17, wherein the processor is configured to compare the primary cost and the alternate cost to select between the behavior plan from the primary path plan and the behavior plan from the alternate path plan to traverse with the autonomous vehicle.

* * * * *